United States Patent [19]
Russell

[11] Patent Number: 5,729,639
[45] Date of Patent: Mar. 17, 1998

[54] SENSOR SYSTEM HAVING DETECTOR TO DETECTOR RESPONSIVITY CORRECTION FOR PUSHBROOM SENSOR

[75] Inventor: E. E. Russell, Goleta, Calif.

[73] Assignee: Santa Barbara Research Center, Goleta, Calif.

[21] Appl. No.: 442,291

[22] Filed: May 16, 1995

[51] Int. Cl.$^6$ .................................................. G06K 9/00
[52] U.S. Cl. ........................................ 382/312; 382/293
[58] Field of Search ................................ 382/312, 317, 382/103, 286, 323, 293, 319, 295, 274, 296, 270, 302, 276, 277, 181, 190, 318, 297, 100, 273, 104, 106, 107, 153; 250/208.1, 330, 334; 348/250, 167, 243, 247, 251, 244, 245, 246, 219, 207; 364/571.01, 498; 358/406, 474, 494, 496, 497, 498

[56] References Cited

U.S. PATENT DOCUMENTS

| | | | |
|---|---|---|---|
| 4,350,443 | 9/1982 | Williamson | 356/358 |
| 4,520,504 | 5/1985 | Walker et al. | 382/1 |
| 4,920,418 | 4/1990 | Robinson | 348/219 |
| 5,117,445 | 5/1992 | Seppi et al. | 378/65 |
| 5,134,474 | 7/1992 | Hanafusa et al. | 358/113 |
| 5,252,818 | 10/1993 | Gerlach et al. | 250/208.1 |
| 5,303,165 | 4/1994 | Ganz et al. | 364/571.01 |

FOREIGN PATENT DOCUMENTS

| | | | |
|---|---|---|---|
| 0 601 534 A1 | 6/1994 | European Pat. Off. | H04N 5/33 |
| 0 612 185 A1 | 8/1994 | European Pat. Off. | H04N 5/225 |

Primary Examiner—Leo Boudreau
Assistant Examiner—Bijan Tadayon
Attorney, Agent, or Firm—W. C. Schubert; W. K. Denson-Low

[57] ABSTRACT

A responsivity calibration system for use with an array of detectors. The system includes a first mechanism for changing the orientation of the detector array from the first orientation, during an operational mode, to a second orientation, during a calibration mode, in which each detector sequentially samples the same portion of the same scene. The system adjusts the output generated by each of the detectors in the first orientation in response to an associated signal generated by that respective detector in the second orientation. In a specific implementation, a normalization factor is generated based on the output of each detector during the calibration mode. The normalization factor is stored and multiplied by the outputs of the detectors during the operational mode. Hence responsivity correction is implemented without the need for a wide area scene of extreme uniformity or an on-board target.

9 Claims, 2 Drawing Sheets

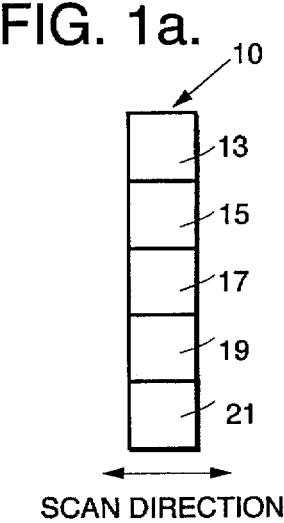
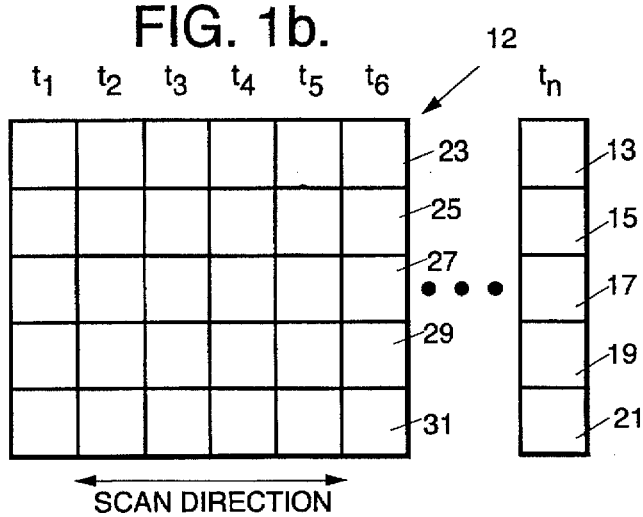
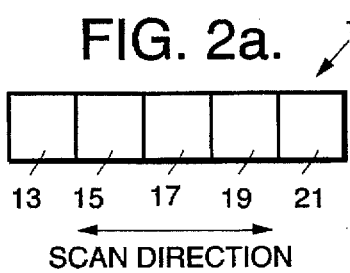
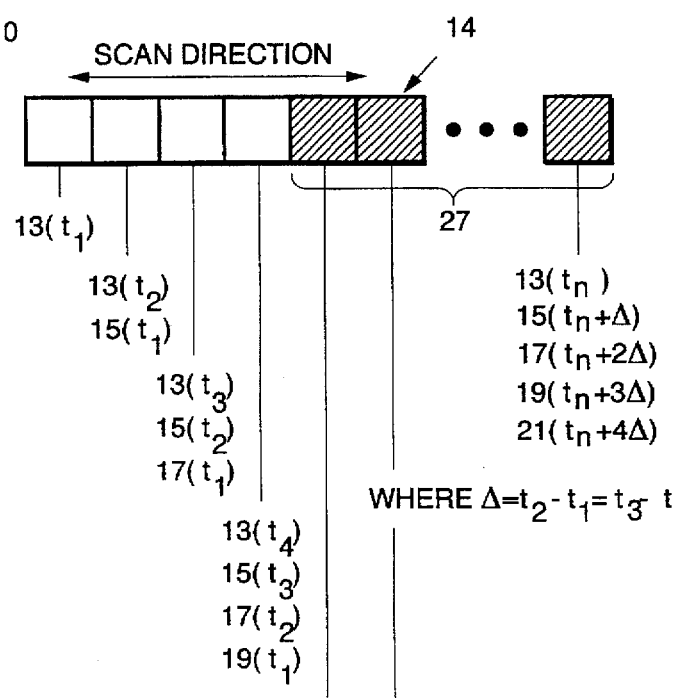
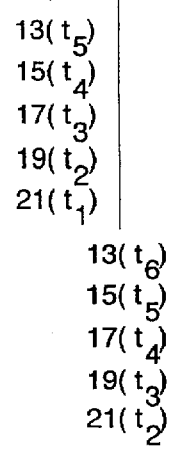

SENSOR SYSTEM HAVING DETECTOR TO DETECTOR RESPONSIVITY CORRECTION FOR PUSHBROOM SENSOR

BACKGROUND OF THE INVENTION

1. Field of the Invention

The present invention relates to sensing and imaging systems. More specifically, the present invention relates to pushbroom type sensors mounted on spacecraft and the like.

2. Description of the Related Art

Imaging sensors and detectors, particularly those mounted on spacecraft, planetary probes and other instruments comprise one or more detectors which either stare at a scene or are scanned over a field of regard. For many applications, the use of a linear array of detectors is most cost effective. A pushbroom sensor is one such application. Pushbroom sensors are comprised of linear array of detectors which are scanned over a field of regard by the motion of the vehicle on which the sensor is mounted.

In pushbroom sensors, image uniformity requires uniform detector response across the array. If the response of the detectors is not uniform, streaking, striping and/or banding will appear in the sensed image depending on the number and location of the detectors with the dissimilar response.

One approach to the problem has been to test the performance of the array prior to launch of the spacecraft. However, this approach has been found to be inadequate as the responsivity of the detectors often changes as a result launch stresses.

Another conventional approach involves an averaging of the detector responses across a uniform scene over a long period of time. The detectors are then calibrated accordingly. This approach, however, suffers from a requirement of a extremely uniform scene having a wide area. However, it is difficult to find a scene that does not have systematic biases.

Yet another approach involves the use of an on-board target such as a solar diffuser to provide input imagery for detector calibration. However, there are several problems associated with this approach. First, there is the problem of moving the target in front of the sensor or vice versa. Secondly, it is difficult to get a uniform distribution of input radiant power (light) across the array. Thirdly, it is difficult to vary the light level to ascertain whether there are any differences in linearity of the detectors.

Hence, there is a need in the art for a system or technique for responsivity calibration of detectors in a sensor array which does not require a wide area, uniform scene or an on-board target.

SUMMARY OF THE INVENTION

The need in the art is addressed by the present invention which provides a responsivity calibration system for use with an array of detectors. The invention includes a first mechanism for changing the orientation of the detector array from the first orientation, during an operational mode, to a second orientation, during a calibration mode, in which each detector sequentially samples the same portion of the same scene. The inventive system adjusts the output generated by each of the detectors in the first orientation in response to an associated signal generated by that respective detector in the second orientation.

In a specific implementation, a normalization factor is generated based on the output of each detector during the calibration mode. The normalization factor is stored and multiplied by the outputs of the detectors during the operational mode. Hence responsivity correction is implemented without the need for either a wide area scene of extreme uniformity or an on-board target.

BRIEF DESCRIPTION OF THE DRAWINGS

FIG. 1a is a simplified frontal view of a linear detector array in a first operational orientation.

FIG. 1b shows the footprints of the detectors in the array of FIG. 1a as the array is scanned in a first (operational) orientation.

FIG. 2a is a simplified frontal view of a linear detector array of FIG. 1a in a second (calibration) orientation.

FIG. 2b shows the footprint of the detectors in the array as the array is scanned in the second orientation. The positions of the detectors at sequential times etc. are denoted by the detector number followed by the appropriate time in brackets. The detector responsivity corrections utilize detector data collected by the different detectors sequentially viewing the same areas of the scene.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1a is a simplified frontal view of a linear detector array in a first operational orientation. The array 10 includes plural detectors 13–21 (odd numbers only) disposed in a rectilinear arrangement. As the array 10 is moved along the scan axis illustrated in FIG. 1a, the detectors 13–21 scan the areas 23–31 (odd numbers only) respectively in the array footprint 12 illustrated in FIG. 1b. The outputs of the detectors are processed and displayed in a conventional manner.

FIG. 1b shows the footprints of the detectors in the array 10 as the array is scanned in a first (operational) orientation. The positions of the detectors are indicated at times t1, t2, t3, t4, t5, t6, ... tn. As mentioned above, if the responsivity of any of the detectors is dissimilar to the others, streaking, striping and/or banding may appear in the output image. The present invention addresses this problem without the use of a wide area uniform scene or an onboard calibration target.

In accordance with the present teachings, the orientation of the linear array 10 is changed during a calibration mode from that shown in FIG. 1a to that shown in FIG. 2a.

FIG. 2a is a simplified frontal view of a linear detector array of FIG. 1a in a second (calibration) orientation. The second orientation of FIG. 2a is transverse to the first orientation of FIG. 1a. The scan area 14 of the array 10 during the calibration mode is illustrated in FIG. 2b.

Figure 3:
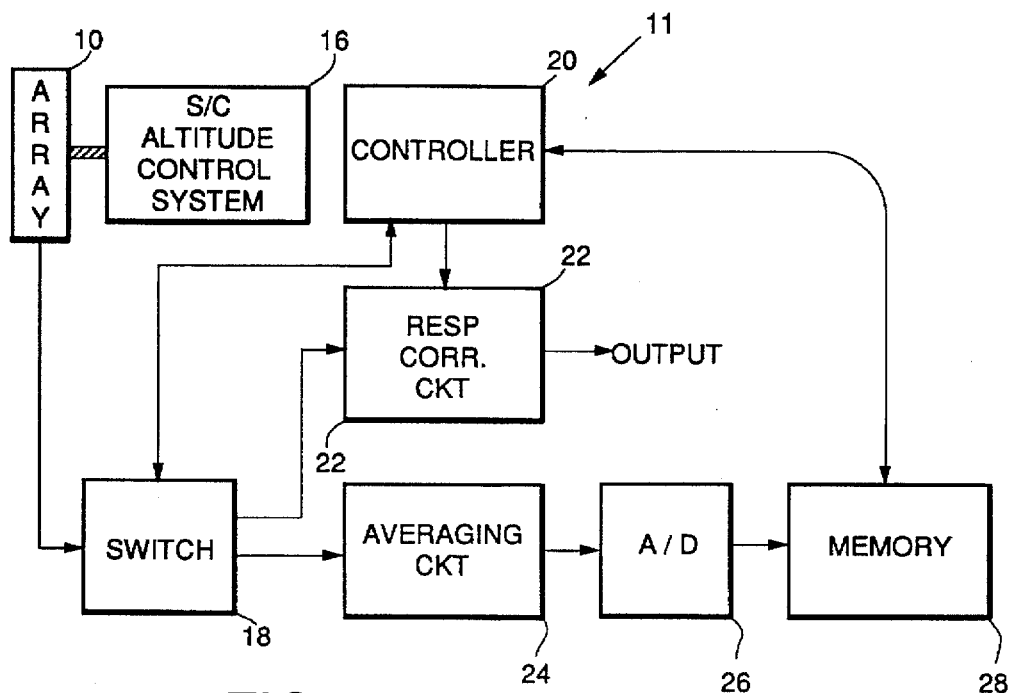
FIG. 3 is a block diagram of an onboard detector responsivity correction system implemented in accordance with the present teachings.
Figure 4:
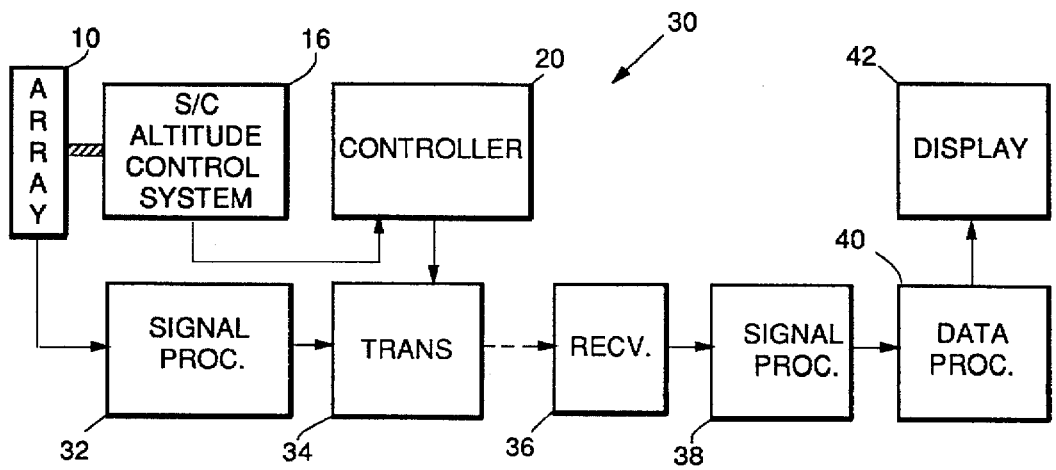
FIG. 4 is a block diagram of an alternative embodiment of the detector responsivity correction system of the present invention by which responsivity correction is effected off-platform relative to the detector array.

FIG. 2b shows the footprint 14 of the detectors in the array 10 as the array is scanned in the second orientation. The positions of the detectors at sequential times t1, t2, etc. are denoted by the detector number followed by the appropriate time in brackets. The detector responsivity corrections utilize detector data collected by the different detectors sequentially viewing the same areas of the scene. In this orientation, all of the detectors 13–21 scan the same area 27, which is shown shaded. This allows for a comparison and normalization of the outputs of the detectors. FIGS. 3 and 4 illustrate two systems for practicing the present invention.

FIG. 3 is a block diagram of an onboard detector responsivity correction system implemented in accordance with the present teachings. The system 11 includes the detector array 10 which is mounted on a spacecraft (not shown). As the spacecraft orbits, the array 10 performs a pushbroom scan of the surface. The orientation of the array is changed during calibration by a conventional spacecraft attitude control system 16. When responsivity correction is required, an onboard controller 20 signals the spacecraft to rotate 90 degrees about the line of sight of the array. In the alternative, the array alone may be rotated if mounted for rotation about the line of sight. In any event, this places the array in the second orientation illustrated in FIG. 2a. Simultaneously, the controller 20 signals a switch 18 to direct the output of the array 10 to an averaging circuit 24 which may be implemented in accordance with conventional teachings. Numerous samples are taken for each detector and averaged. The averaged detector outputs are then digitized by an analog to digital converter 26 and stored in a memory 28.

During calibration, data collection should be extended, as a minimum, over the time required for the along-track motion to move each of the detectors to be calibrated over the same portion of the scene. Some additional time should be allocated to averaging multiple samples over a more extended portion of the scene to reduce (by averaging) the effects of system noise and non-ideal vehicle pointing. The latter effect can be further mitigated by utilizing a scene which is uniform over an area greater than the pointing control "wander".

In operation, the outputs of the detectors are switched to a responsivity correction circuit 22. The responsivity correction circuit 22 may be implemented with a digital multiplier. The correction circuit 22 multiplies the stored values by a correction factor generated by the controller 20 in accordance with the responsivity measurements stored in the memory 28. In the alternative, providing the ratio of the signals from different detectors collected while viewing the same scene directly provides the desired relative responsivity calibration between detectors at the scene radiance level utilized.

In any case, the controller 20 provides a normalization factor for each detector which is effective, when multiplied by the instantaneous detector output, to provide a uniform output for all detectors in response to a uniform input.

FIG. 4 is a block diagram of an alternative embodiment of the detector responsivity correction system of the present invention by which responsivity correction is effected off-platform relative to the detector array. In the alternative embodiment 30 of FIG. 4, the detector outputs during calibration are processed by an onboard signal processor 32 and transmitted by a transmitter 34 under command of a controller 20. A receiver 36 mounted at a ground station or other location provides the calibration signals to a second conventional signal processor 38. The first and second signal processors 32 and 38 condition and amplify the signals as may be necessary to effect optimal transmission over a channel. The output of the signal processor 38 is input to a data processor 40 which stores the calibration signals and provides normalization factors for each detector. In operation, the data processor 40 adjusts the outputs of each detector in accordance with the normalization factor for each respective detector to eliminate any streaking, striping or banding of the output image.

The output of the data processor may be input to a display 42. In the alternative, the output of the data processor 40 may be transmitted or stored as required for a given application.

A significant feature of the invention is that responsivity calibration may be provided over the full dynamic range of the sensor, since the range of calibration is limited only by the available scene radiance levels. All that is required to achieve this detector-to-detector responsivity calibration over the dynamic range of interest is to perform the calibration while viewing scenes with the desired radiance levels.

Thus, the present invention has been described herein with reference to a particular embodiment for a particular application. Those having ordinary skill in the art and access to the present teachings will recognize additional modifications applications and embodiments within the scope thereof. For example, the invention is not limited to use with linear arrays. The present teachings may be applied to detectors arranged in other configurations so long as the detectors are moved in another direction relative to a normal scan direction. For example, for a staggered linear array consisting of two subarrays, the calibration process would proceed in two steps. In a first step, the subarrays would be oriented relative to the track direction such that the track direction is aligned along the length of the subarrays. This will provide the data required to separately inter-calibrate among the detectors within each subarray. In the second step, the alignment would be such that detectors in the one subarray are aligned subsequently with detectors in the second subarray. The latter data would provide the means to inter-calibrate between detectors in the two arrays. These data in combination are sufficient to provide detector-to-detector relative responsivity calibration among the entire set of detectors in the two subarrays. This method may be extended by the same process to more complex two-dimensional array configurations.

It is therefore intended by the appended claims to cover any and all such applications, modifications and embodiments within the scope of the present invention.

Accordingly,
What is claimed is:

1. A responsivity calibration system for use with an array of detectors aligned in a first orientation, the system comprising:

first means for changing the orientation of the detector array from the first orientation, during an operational mode, to a second orientation, during a calibration mode, in which each detector sequentially samples portion of the same scene and second means for adjusting the output generated by each of the detectors in the first orientation in response to an associated signal generated by the respective detector in the second orientation.

2. The invention of claim 1 wherein the second means includes means for providing a normalization factor for each detector based on a signal generated by each detector in the second orientation.

3. The invention of claim 2 wherein the second means includes means for multiplying the outputs of each of the detectors by a corresponding normalization factor.

4. The invention of claim 3 wherein the second means includes memory means for storing the normalization factors.

5. The invention of claim 4 wherein the second means includes means for averaging the signals generated by the detectors in the second orientation.

6. The invention of claim 5 wherein the second means further includes means for digitizing the averaged signals.

7. The invention of claim 6 further including switching means for connecting the outputs of the detectors to the digitizing means during the calibration mode.

8. An imaging system comprising:

first means for detecting electromagnetic energy from a scene, the first means including a linear array of detectors;

second means for changing the orientation of the array from a first operational orientation to a second calibration orientation in which each detector sequentially samples the same portion of the same scene;

third means for adjusting the output generated by each detector in the first orientation in response to an associated signal generated by the detector in the second orientation; and fourth means for providing an image based on the adjusted output signals.

9. A method for responsivity calibration for use with an array of detectors aligned in a first orientation, the method including the steps of:

changing the orientation of the detector array from the first orientation, during an operational mode, to a second orientation, during a calibration mode, in which each detector sequentially samples the same portion of the same scene and adjusting the output generated by each of the detectors in the first orientation in response to an associated signal generated by the detector in the second orientation.

* * * * *